(12) United States Patent
Schattka et al.

(10) Patent No.: US 8,039,521 B2
(45) Date of Patent: Oct. 18, 2011

(54) ADDITIVE BUILDING MATERIAL MIXTURES CONTAINING DIFFERENT-SIZED MICROPARTICLES

(75) Inventors: Jan Hendrik Schattka, Hanau (DE); Holger Kautz, Hanau (DE); Gerd Loehden, Hanau (DE)

(73) Assignee: Evonik Roehm GmbH, Darmstadt (DE)

( * ) Notice: Subject to any disclaimer, the term of this patent is extended or adjusted under 35 U.S.C. 154(b) by 55 days.

(21) Appl. No.: 11/388,307

(22) Filed: Mar. 24, 2006

(65) Prior Publication Data

US 2007/0193159 A1 Aug. 23, 2007

(30) Foreign Application Priority Data

Feb. 23, 2006 (DE) .................. 10 2006 008 965

(51) Int. Cl.
*C04B 24/26* (2006.01)
*C09D 201/08* (2006.01)
*C08F 2/22* (2006.01)

(52) U.S. Cl. .............. 521/55; 523/201; 524/5; 106/677; 52/3; 52/309.4

(58) Field of Classification Search .................. 524/5, 7, 524/8; 106/677; 52/309.4, 309.17, 3; 428/312.4, 428/327, 407; 521/55, 83; 523/201
See application file for complete search history.

(56) References Cited

U.S. PATENT DOCUMENTS

| | | | | |
|---|---|---|---|---|
| 4,057,526 A | * | 11/1977 | de Rook | 521/55 |
| 5,521,253 A | * | 5/1996 | Lee et al. | 525/301 |
| 5,794,403 A | | 8/1998 | Oberlander et al. | |
| 5,989,630 A | * | 11/1999 | Schlarb et al. | 427/213.36 |
| 6,498,209 B1 | | 12/2002 | Loehden et al. | |
| 6,566,441 B1 | | 5/2003 | Lohden et al. | |
| 6,673,451 B2 | * | 1/2004 | Bardman et al. | 428/402.22 |
| 6,809,163 B2 | | 10/2004 | Schultes et al. | |
| 6,989,409 B2 | | 1/2006 | Loehden et al. | |
| 7,049,355 B2 | | 5/2006 | Quis et al. | |
| 2004/0034147 A1 | * | 2/2004 | Zama | 524/460 |
| 2004/0116567 A1 | | 6/2004 | Schmitt et al. | |
| 2005/0274294 A1 | * | 12/2005 | Brower et al. | 106/802 |
| 2007/0068088 A1 | * | 3/2007 | Einfeldt et al. | 52/3 |
| 2007/0117948 A1 | | 5/2007 | Loehden et al. | |
| 2007/0259987 A1 | | 11/2007 | Schattka et al. | |
| 2008/0057205 A1 | | 3/2008 | Lohden et al. | |
| 2008/0292893 A1 | | 11/2008 | Loehden et al. | |
| 2009/0048401 A1 | | 2/2009 | Loehden et al. | |
| 2009/0062508 A1 | | 3/2009 | Balk et al. | |

FOREIGN PATENT DOCUMENTS

| | | |
|---|---|---|
| DE | 2 259 573 | 6/1974 |
| DE | 198 33 062 A1 | 2/2000 |
| EP | 0 022 633 A2 | 1/1981 |
| WO | WO 85/01499 | 4/1985 |
| WO | WO 2005/123618 A2 | 12/2005 |
| WO | WO 2006/133856 A1 | 12/2006 |

OTHER PUBLICATIONS

U.S. Appl. No. 11/387,805, filed Mar. 24, 2006, Kautz, et al.
U.S. Appl. No. 11/387,803, filed Mar. 24, 2006, Schattka, et al.
U.S. Appl. No. 11/388,048, filed Mar. 24, 2006, Kautz, et al.
U.S. Appl. No. 11/388,042, filed Mar. 24, 2006, Schattka, et al.
U.S. Appl. No. 11/387,977, filed Mar. 24, 2006, Schattka, et al.
U.S. Appl. No. 11/387,976, filed Mar. 24, 2006, Kautz et al.
U.S. Appl. No. 11/381,812, filed Mar. 24, 2006, Schattka, et al.
U.S. Appl. No. 11/388,046, filed Mar. 24, 2006, Kautz, et al.
U.S. Appl. No. 11/388,040, filed Mar. 24, 2006, Schattka, et al.
U.S. Appl. No. 11/387,816, filed Mar. 24, 2006, Schattka, et al.
U.S. Appl. No. 11/387,817, filed Mar. 24, 2006, Kautz, et al.
U.S. Appl. No. 11/571,115, filed Dec. 21, 2006, Schattka, et al.
U.S. Appl. No. 11/997,621, filed Feb. 1, 2008, Loehden, et al.
U.S. Appl. No. 12/064,245, filed Feb. 20, 2008, Schattka, et al.
U.S. Appl. No. 60/975,574, filed Sep. 27, 2007, Kuppert, et al.
U.S. Appl. No. 12/441,664, filed Mar. 17, 2009, Schattka, et al.
U.S. Appl. No. 12/290,880, filed Nov. 4, 2008, Einfeldt, et al.
U.S. Appl. No. 12/301,903, filed Nov. 21, 2008, Balk, et al.
U.S. Appl. No. 12/373,732, filed Jan. 14, 2009, Balk, et al.
U.S. Appl. No. 12/304,275, filed Dec. 11, 2008, Balk, et al.
U.S. Appl. No. 12/373,892, filed Jan. 15, 2009, Balk, et al.
U.S. Appl. No. 12/373,531, filed Jan. 13, 2009, Schattka, et al.
U.S. Appl. No. 12/440,244, filed Mar. 6, 2009, Balk, et al.
U.S. Appl. No. 12/279,197, filed Oct. 21, 2008, Roos, et al.

* cited by examiner

*Primary Examiner* — Fred M Teskin

(74) *Attorney, Agent, or Firm* — Oblon, Spivak, McClelland, Maier & Neustadt, L.L.P.

(57) ABSTRACT

The present invention relates to the use of different-sized polymeric microparticles in hydraulically setting building material mixtures for the purpose of enhancing their frost resistance and cyclical freeze/thaw durability.

30 Claims, No Drawings

ADDITIVE BUILDING MATERIAL MIXTURES CONTAINING DIFFERENT-SIZED MICROPARTICLES

The present invention relates to the use of polymeric microparticles in hydraulically setting building material mixtures for the purpose of enhancing their frost resistance and cyclical freeze/thaw durability.

Concrete is an important building material and is defined by DIN 1045 (07/1988) as artificial stone formed by hardening from a mixture of cement, aggregate and water, together where appropriate with concrete admixtures and concrete additions. One way in which concrete is classified is by its subdivision into strength groups (BI-BII) and strength classes (B5-B55). Mixing in gas-formers or foam-formers produces aerated concrete or foamed concrete (Römpp Lexikon, 10th ed., 1996, Georg Thieme Verlag).

Concrete has two time-dependent properties. Firstly, by drying out, it undergoes a reduction in volume that is termed shrinkage. The majority of the water, however, is bound in the form of water of crystallization. Concrete, rather than drying, sets: that is, the initially highly mobile cement paste (cement and water) starts to stiffen, becomes rigid, and, finally, solidifies, depending on the timepoint and progress of the chemical/mineralogical reaction between the cement and the water, known as hydration. As a result of the water-binding capacity of the cement it is possible for concrete, unlike quicklime, to harden and remain solid even under water. Secondly, concrete undergoes deformation under load, known as creep.

The freeze/thaw cycle refers to the climatic alternation of temperatures around the freezing point of water. Particularly in the case of mineral-bound building materials such as concrete, the freeze/thaw cycle is a mechanism of damage. These materials possess a porous, capillary structure and are not watertight. If a structure of this kind that is full of water is exposed to temperatures below 0° C., then the water freezes in the pores. As a result of the density anomaly of water, the ice then expands. This results in damage to the building material. Within the very fine pores, as a result of surface effects, there is a reduction in the freezing point. In micropores water does not freeze until below −17° C. Since, as a result of freeze/thaw cycling, the material itself also expands and contracts, there is additionally a capillary pump effect, which further increases the absorption of water and hence, indirectly, the damage. The number of freeze/thaw cycles is therefore critical with regard to damage.

Decisive factors affecting the resistance of concrete to frost and to cyclical freeze/thaw under simultaneous exposure to thawing agents are the imperviousness of its microstructure, a certain strength of the matrix, and the presence of a certain pore microstructure. The microstructure of a cement-bound concrete is traversed by capillary pores (radius: 2 μm-2 mm) and gel pores (radius: 2-50 nm). Water present in these pores differs in its state as a function of the pore diameter. Whereas water in the capillary pores retains its usual properties, that in the gel pores is classified as condensed water (mesopores: 50 nm) and adsorptively bound surface water (micropores: 2 nm), the freezing points of which may for example be well below −50° C. [M. J. Setzer, Interaction of water with hardened cement paste, Ceramic Transactions 16 (1991) 415-39]. Consequently, even when the concrete is cooled to low temperatures, some of the water in the pores remains unfrozen (metastable water). For a given temperature, however, the vapor pressure over ice is lower than that over water. Since ice and metastable water are present alongside one another simultaneously, a vapor-pressure gradient develops which leads to diffusion of the still-liquid water to the ice and to the formation of ice from said water, resulting in removal of water from the smaller pores or accumulation of ice in the larger pores. This redistribution of water as a result of cooling takes place in every porous system and is critically dependent on the type of pore distribution.

The artificial introduction of microfine air pores in the concrete hence gives rise primarily to what are called expansion spaces for expanding ice and ice-water. Within these pores, freezing water can expand or internal pressure and stresses of ice and ice-water can be absorbed without formation of microcracks and hence without frost damage to the concrete. The fundamental way in which such air-pore systems act has been described, in connection with the mechanism of frost damage to concrete, in a large number of reviews [Schulson, Erland M. (1998) Ice damage to concrete. CRREL Special Report 98-6; S. Chatterji, Freezing of air-entrained cement-based materials and specific actions of air-entraining agents, Cement & Concrete Composites 25 (2003) 759-65; G. W. Scherer, J. Chen & J. Valenza, Methods for protecting concrete from freeze damage, U.S. Pat. No. 6,485,560 B1 (2002); M. Pigeon, B. Zuber & J. Marchand, Freeze/thaw resistance, Advanced Concrete Technology 2 (2003) 11/1-11/17; B. Erlin & B. Mather, A new process by which cyclic freezing can damage concrete—the Erlin/Mather effect, Cement & Concrete Research 35 (2005) 1407-11].

A precondition for improved resistance of the concrete on exposure to the freezing and thawing cycle is that the distance of each point in the hardened cement from the next artificial air pore does not exceed a defined value. This distance is also referred to as the "Powers spacing factor" [T. C. Powers, The air requirement of frost-resistant concrete, Proceedings of the Highway Research Board 29 (1949) 184-202]. Laboratory tests have shown that exceeding the critical "Power spacing factor" of 500 μm leads to damage to the concrete in the freezing and thawing cycle. In order to achieve this with a limited air-pore content, the diameter of the artificially introduced air pores must therefore be less than 200-300 μm [K. Snyder, K. Natesaiyer & K. Hover, The stereological and statistical properties of entrained air voids in concrete: A mathematical basis for air void systems characterization, Materials Science of Concrete VI (2001) 129-214].

There are various possibilities for assessing the stability of a building material mixture toward frost and cyclical freezing/thawing.

One of these is the optical assessment of the surface of a sample which has been exposed to defined freeze/thaw conditions. The damage to the surface is graded using a scale defined by reference to comparison samples (for instance, from 0=no damage to 5=very severe damage), thereby allowing a qualitative comparison. This numerical value is termed the weathering factor.

The formation of an artificial air-pore system depends critically on the composition and the conformity of the aggregates, the type and amount of the cement, the consistency of the concrete, the mixer used, the mixing time, and the temperature, but also on the nature and amount of the agent that forms the air pores, the air entrainer. Although these influencing factors can be controlled if account is taken of appropriate production rules, there may nevertheless be a multiplicity of unwanted adverse effects, resulting ultimately in the concrete's air content being above or below the desired level and hence adversely affecting the strength or the frost resistance of the concrete.

Artificial air pores of this kind cannot be metered directly; instead, the air entrained by mixing is stabilized by the addition of the aforementioned air entrainers [L. Du & K. J. Folliard, Mechanism of air entrainment in concrete, Cement & Concrete Research 35 (2005) 1463-71]. Conventional air entrainers are mostly surfactant-like in structure and break up the air introduced by mixing into small air bubbles having a diameter as far as possible of less than 300 µm, and stabilize them in the wet concrete microstructure. A distinction is made here between two types.

One type—for example sodium oleate, the sodium salt of abietic acid or Vinsol resin, an extract from pine roots—reacts with the calcium hydroxide of the pore solution in the cement paste and is precipitated as insoluble calcium salt. These hydrophobic salts reduce the surface tension of the water and collect at the interface between cement particle, air and water. They stabilize the microbubbles and are therefore encountered at the surfaces of these air pores in the concrete as it hardens.

The other type—for example sodium lauryl sulfate (SDS) or sodium dodecyl-phenylsulfonate—reacts with calcium hydroxide to form calcium salts which, in contrast, are soluble, but which exhibit an abnormal solution behavior. Below a certain critical temperature the solubility of these surfactants is very low, while above this temperature their solubility is very good. As a result of preferential accumulation at the air/water boundary they likewise reduce the surface tension, thus stabilize the microbubbles, and are preferably encountered at the surfaces of these air pores in the hardened concrete.

The use of these prior-art air entrainers is accompanied by a host of problems [L. Du & K. J. Folliard, Mechanism of air entrainment in concrete, Cement & Concrete Research 35 (2005) 1463-71. For example, prolonged mixing times, different mixer speeds and altered metering sequences in the case of ready-mix concretes result in the expulsion of the stabilized air (in the air pores).

The transporting of concretes with extended transport times, poor temperature control and different pumping and conveying equipment, and also the introduction of these concretes in conjunction with altered subsequent processing, jerking and temperature conditions, can produce a significant change in an air-pore content set beforehand. In the worst case this may mean that a concrete no longer complies with the required limiting values of a certain exposure class and has therefore become unusable [EN 206-1 (2000), Concrete—Part 1: Specification, performance, production and conformity].

The amount of fine substances in the concrete (e.g. cement with different alkali content, additions such as flyash, silica dust or color additions) likewise adversely affects air entrainment. There may also be interactions with flow improvers that have a defoaming action and hence expel air pores, but may also introduce them in an uncontrolled manner.

A further disadvantage of the introduction of air pores is seen as being the decrease in the mechanical strength of the concrete with increasing air content.

All of these influences which complicate the production of frost-resistant concrete can be avoided if, instead of the required air-pore system being generated by means of above-mentioned air entrainers with surfactant-like structure, the air content is brought about by the admixing or solid metering of polymeric microparticles (hollow microspheres) [H. Sommer, A new method of making concrete resistant to frost and de-icing salts, Betonwerk & Fertigteiltechnik 9 (1978) 476-84]. Since the microparticles generally have particle sizes of less than 100 µm, they can also be distributed more finely and uniformly in the concrete microstructure than can artificially introduced air pores. Consequently, even small amounts are sufficient for sufficient resistance of the concrete to the freezing and thawing cycle.

The use of polymeric microparticles of this kind for improving the frost resistance and cyclical freeze/thaw durability of concrete is already known from the prior art [cf. DE 2229094 A1, U.S. Pat. No. 4,057,526 B1, U.S. Pat. No. 4,082, 562 B1, DE 3026719 A1]. The microparticles described therein have diameters of at least 10 µm (usually substantially larger) and possess air-filled or gas-filled voids. This likewise includes porous particles, which can be larger than 100 µm and may possess a multiplicity of relatively small voids and/or pores.

With the use of hollow microparticles for artificial air entrainment in concrete, two factors proved to be disadvantageous for the implementation of this technology on the market. Relatively high added amounts are required in order to achieve satisfactory resistance of the concrete to freezing and thawing cycles. The object on which the present invention is based was therefore that of providing a means of improving the frost resistance and cyclical freeze/thaw durability for hydraulically setting building material mixtures that develops its full activity even in relatively low doses. A further object was not, or not substantially, to impair the mechanical strength of the building material mixture as a result of this means. Additionally, the intention was that the weathering factor should be improved.

The object has been achieved through the use of polymeric microparticles, containing a void, in hydraulically setting building material mixtures, characterized in that at least two types of microparticles are used which have a different average particle diameter.

The average particle size is determined by, for example, counting a statistically significant amount of particles, employing transmission electron micrographs. The microparticles used may be of the same kind and may differ merely in the particle size. The difference in average particle sizes is preferably at least 20%. Particular preference is given to a difference in average particle sizes of at least 50%.

In a further preferred embodiment it is also possible to use particles of different kinds. In this case it is possible, for example, to use core/shell particles prepared by emulsion polymerization, having a swollen core, together with hollow microspheres having a diameter of several micrometers. The latter are available commercially, for example, under the trade name Expancel (Akzo Nobel).

In a further embodiment of the invention the microparticles may also be prepared actually at the synthesis stage with an at least bimodal particle size distribution.

In all cases it is preferred for at least one of the types of particles present in the mixture to have an average particle size of less than 1000 nm.

Surprisingly it has been found that by virtue of these mixtures it is possible to achieve an outstanding improvement in the resistance of building material mixtures toward frost and cyclical freezing/thawing.

In contrast to air pores, which weaken the mechanical strength of the concrete, no notable deterioration is observed when using the hollow sphere mixtures of the invention.

In comparison between a sample of concrete equipped with inventively different microparticles and samples containing the microparticles used in the mixture each individually in the same amount, the best weathering factor was found for the sample equipped in accordance with the invention.

As an explanation, though not intended to restrict the scope of the invention, it is assumed that large microparticles lose more quickly the water they contain, if indeed not—as in the case of Expancel—containing any water from the outset. Very soon after the hardening of the building material mixture, and ensure a basic strength.

The smaller microparticles, however, ensure a very low spacing factor ("Powers spacing factor"), since the volume they introduce is distributed over a very large number of particles and so is distributed very uniformly in the building material matrix.

The combination of these two contributions shows an effect which goes beyond the effect of the microparticles employed separately.

The microparticles of the invention can be prepared, for example, by emulsion polymerization and in that case preferably have a particle size of 100 to 5000 nm.

Microparticles prepared in other ways and used in combination with these microparticles may have substantially larger particle diameters. In the case of Expancel, for example, between 20 and 150 µm.

In one embodiment, at least one of the microparticles has a diameter of more than 10 µm. In another embodiment, at least one of the microparticles is a gas-filled polymer particle having a diameter of more than 10 µm.

The particle size is determined by, for example, measuring and counting a statistically significant amount of particles, employing transmission electron micrographs.

In the case of preparation by emulsion polymerization the microparticles are obtained in the form of an aqueous dispersion. Accordingly the addition of the microparticles to the building material mixture takes place preferably likewise in this form.

Microparticles of this kind are already known in the prior art and are described in the publications EP 22 633 B1, EP 73 529 B1 and EP 188 325 B1. Furthermore, these water-filled microparticles are sold commercially under the brand name ROPAQUE® by Rohm & Haas.

In the case of preparation, and in the dispersion, the voids in the microparticles are water-filled. Without restricting the invention to this effect, it is assumed that the water is lost—at least partly—from the particles as the building material mixture hardens, after which, correspondingly, gas-filled or air-filled hollow spheres are present.

This process also takes place, for example, when microparticles of this kind are used in paints.

According to one preferred embodiment the microparticles used are composed of polymer particles which possess a core (A) and at least one shell (B), the core/shell polymer particles having been swollen by means of a base.

The core (A) of the particle contains one or more ethylenically unsaturated carboxylic acid (derivative) monomers which permit swelling of the core; these monomers are preferably selected from the group of acrylic acid, methacrylic acid, maleic acid, maleic anhydride, fumaric acid, itaconic acid and crotonic acid and mixtures thereof. Acrylic acid and methacrylic acid are particularly preferred.

The shell (B) predominantly of nonionic, ethylenically unsaturated monomers. As such monomers, preferably, use is made of styrene, butadiene, vinyltoluene, ethylene, vinyl acetate, vinyl chloride, vinylidene chloride, acrylonitrile, acrylamide, methacrylamide, C1-C12 alkyl esters of (meth) acrylic acid or mixtures thereof.

The preparation of these polymeric microparticles by emulsion polymerization and their swelling by means of bases such as alkali or alkali metal hydroxides and also ammonia or an amine are likewise described in European patents EP 22 633 B1, EP 735 29 B1 and EP 188 325 B1.

It is possible to prepare core-shell particles which have a single-shell or multi-shell construction, or whose shells exhibit a gradient.

The polymer content of the microparticles used may be situated, as a function for example of the diameter, the core/shell ratio and the swelling efficiency, at 2% to 98% by volume.

Whereas in accordance with the invention the water-filled polymeric microparticles are preferably used in the form of an aqueous dispersion, within the scope of the present invention it is entirely possible to add the water-filled microparticles directly as a solid to the building material mixture. For that purpose the microparticles for example—by methods known to the skilled worker—are coagulated and isolated from the aqueous dispersion by standard methods (e.g. filtration, centrifuging, sedimentation and decanting). The material obtained can be washed in order to arrive at a further reduction in the surfactant content, and is subsequently dried.

The water-filled microparticles are added to the building material mixture in a preferred amount of 0.01% to 5% by volume, in particular 0.1% to 0.5% by volume. The building material mixture, in the form for example of concrete or mortar, may in this case include the customary hydraulically setting binders, such as cement, lime, gypsum or anhydrite, for example.

Through the use of the microparticles of the invention is it possible to keep the introduction of air into the building material extraordinarily low.

On concrete, for example, findings have included improvements in compressive strengths of more than 35%, as compared with concrete obtained with conventional air entrainment.

Higher compressive strengths are of interest, in addition and in particular, insofar as they make it possible to reduce the cement content of the concrete that is needed for strength to develop, and as a result of this the price per $m^3$ of concrete can be lowered significantly.

The invention claimed is:

1. A method of preparing a hydraulically setting building material mixture, comprising:
   adding a mixture of polymeric microparticles having a diameter of between 100 nm and 150 µm to a hydraulically setting building material;
   wherein at least one of the microparticles present in the mixture has a diameter of less than 1000 nm;
   wherein at least one of the microparticles is a water-filled polymer particle having a diameter of more than 10 µm; and
   wherein said polymeric microparticles comprise a void;
   wherein at least one of the microparticles comprises
   a polymer core (A), which is swollen using an aqueous base and which comprises one or more ethylenically unsaturated monomer having a carboxylic acid group and being in polymerized form, and
   a polymer envelope (B), which comprises predominantly nonionic, ethylenically unsaturated monomers in polymerized form.

2. A method of preparing a hydraulically setting building material mixture, comprising:
   adding polymeric microparticles to a hydraulically setting building material;
   said polymeric microparticles comprising a void;
   wherein at least one of the microparticles is a water-filled polymer particle having a diameter of more than 10 µm; and
   at least one of the microparticles in the mixture has a diameter of less than 1000 nm;
   wherein at least one of the microparticles comprises
   a polymer core (A), which is swollen using an aqueous base and which comprises one or more ethylenically unsaturated monomer having a carboxylic acid group and being in polymerized form, and a polymer envelope (B), which comprises predominantly nonionic, ethylenically unsaturated monomers in polymerized form.

3. A paint, comprising:

a mixture of polymeric microparticles having a diameter of between 100 nm and 150 μm;

wherein at least one of the microparticles present in the mixture has a diameter of less than 1000 nm;

wherein at least one of the microparticles is an at least partly gas-filled polymer particle having a diameter of more than 10 μm; and wherein said polymeric microparticles comprise a void;

wherein at least one of the microparticles comprises a polymer core (A), which is swollen using an aqueous base and which comprises one or more ethylenically unsaturated monomers having a carboxylic acid group and being in polymerized form, and a polymer envelope (B), which comprises predominantly nonionic, ethylenically unsaturated monomers in polymerized form.

4. The method according to claim 1, wherein the ethylenically unsaturated monomers having a carboxylic acid group are selected from the group consisting of acrylic acid, methacrylic acid, maleic acid, fumaric acid, itaconic acid, crotonic acid and mixtures thereof.

5. The method according to claim 1, wherein the nonionic, ethylenically unsaturated monomers are selected from the group consisting of styrene, butadiene, vinyltoluene, ethylene, vinyl acetate, vinyl chloride, vinylidene chloride, acrylonitrile, acrylamide, methacrylamide, C1-C12 alkyl esters of acrylic or methacrylic acid, and mixtures thereof.

6. The method according to claim 1, wherein the polymeric microparticles have a polymer content of 2% to 98% by volume.

7. The method according to claim 1, wherein said hydraulically setting building material mixture comprises 0.01% to 5% by volume of the polymeric microparticles, based on the volume of the building material mixture.

8. The method according to claim 1, wherein said hydraulically setting building material mixture comprises 0.1% to 0.5% by volume of the polymeric microparticles, based on the volume of the building material mixture.

9. The method according to claim 1, wherein said hydraulically setting building material mixture comprises a binder selected from the group consisting of cement, lime, gypsum, anhydrite and mixtures thereof.

10. The method according to claim 1, wherein said hydraulically setting building material mixture is concrete or mortar.

11. The method according to claim 2, wherein the ethylenically unsaturated monomers having a carboxylic acid group are selected from the group consisting of acrylic acid, methacrylic acid, maleic acid, maleic anhydride, fumaric acid, itaconic acid, crotonic acid and mixtures thereof.

12. The method according to claim 2, wherein the nonionic, ethylenically unsaturated monomers are selected from the group consisting of styrene, butadiene, vinyltoluene, ethylene, vinyl acetate, vinyl chloride, vinylidene chloride, acrylonitrile, acrylamide, methacrylamide, C1-C12 alkyl esters of acrylic or methacrylic acid, and mixtures thereof.

13. The method according to claim 2, wherein the polymeric microparticles have a polymer content of 2% to 98% by volume.

14. The method according to claim 2, wherein the hydraulically setting building material mixture comprises 0.01% to 5% by volume of the polymeric microparticles, based on the volume of the building material mixture.

15. The method according to claim 2, wherein the hydraulically setting building material mixture comprises 0.1% to 0.5% by volume of the polymeric microparticles, based on the volume of the building material mixture.

16. The method according to claim 2, wherein the hydraulically setting building material mixture comprises a binder selected from the group consisting of cement, lime, gypsum, anhydrite and mixtures thereof.

17. The method according to claim 2, wherein the hydraulically setting building material mixture is concrete or mortar.

18. The method according to claim 1, wherein said polymeric microparticles are porous.

19. The method according to claim 1, wherein the hydraulically setting building material mixture does not comprise artificial air pores.

20. The method according to claim 1, wherein the hydraulically setting building material mixture comprises polymeric microparticles which differ in average particle size by at least 20%.

21. The method according to claim 1, wherein the hydraulically setting building material mixture comprises polymeric microparticles which differ in average particle size by at least 50%.

22. The paint according to claim 3, wherein the ethylenically unsaturated monomers having a carboxylic acid group are selected from the group consisting of acrylic acid, methacrylic acid, maleic acid, fumaric acid, itaconic acid, crotonic acid and mixtures thereof.

23. The paint according to claim 3, wherein the nonionic, ethylenically unsaturated monomers are selected from the group consisting of styrene, butadiene, vinyltoluene, ethylene, vinyl acetate, vinyl chloride, vinylidene chloride, acrylonitrile, acrylamide, methacrylamide, C1-C12 alkyl esters of acrylic or methacrylic acid, and mixtures thereof.

24. The paint according to claim 3, wherein the polymeric microparticles have a polymer content of 2% to 98% by volume.

25. The paint according to claim 3, comprising 0.01% to 5% by volume of the polymeric microparticles, based on the volume of the paint.

26. The paint according to claim 3, comprising 0.1% to 0.5% by volume of the polymeric microparticles, based on the volume of the paint.

27. The paint according to claim 3, wherein said polymeric microparticles are porous.

28. The paint according to claim 3, which does not comprise artificial air pores.

29. The paint according to claim 3, comprising polymeric microparticles which differ in average particle size by at least 20%.

30. The paint according to claim 3, comprising polymeric microparticles which differ in average particle size by at least 50%.

* * * * *